United States Patent
Wibby

(10) Patent No.: US 10,605,340 B2
(45) Date of Patent: Mar. 31, 2020

(54) ANGULAR MOTION TRANSFER DRIVEN BY BALL BEARINGS

(71) Applicant: NORTHROP GRUMMAN SYSTEMS CORPORATION, Falls Church, VA (US)

(72) Inventor: Story C. Wibby, Hermosa Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 14 days.

(21) Appl. No.: 16/034,642

(22) Filed: Jul. 13, 2018

(65) Prior Publication Data

US 2020/0018385 A1 Jan. 16, 2020

(51) Int. Cl.
*F16H 25/20* (2006.01)

(52) U.S. Cl.
CPC ..... *F16H 25/20* (2013.01); *F16H 2025/2062* (2013.01)

(58) Field of Classification Search
USPC ....... 403/315, 328; 74/502.3, 89.45; 92/172, 92/178
See application file for complete search history.

(56) References Cited

U.S. PATENT DOCUMENTS

| | | | | |
|---|---|---|---|---|
| 1,807,914 A | * | 6/1931 | Hopkins | B66F 13/005 254/98 |
| 3,730,481 A | * | 5/1973 | Ekonen | B66F 3/247 254/93 R |

FOREIGN PATENT DOCUMENTS

| | | |
|---|---|---|
| CH | 157114 A | 9/1932 |
| DE | 20308989 U1 | 9/2003 |
| GB | 2183864 A | 6/1987 |

OTHER PUBLICATIONS

PCT International Search Report of the International Searching Authority dated Sep. 12, 2019 and dated Sep. 20, 2019 for International Application No. PCT/US2019/041212 filed Jul. 10, 2019.

* cited by examiner

*Primary Examiner* — Randell J Krug
(74) *Attorney, Agent, or Firm* — John A. Miller; Shumaker, Loop & Kendrick, LLP

(57) ABSTRACT

A positioning device for positioning an optical component that includes a body having a threaded bore extending through a top surface, a pin chamber extending into a front surface and a ball bearing channel being in communication with the threaded bore and the pin chamber. The device further includes a plurality of ball bearings positioned within the ball bearing channel and a screw threaded into the threaded bore and being coupled to a top one of the ball bearings. The device also includes a positioning pin positioned within the pin chamber, where the positioning pin is coupled to a bottom one of the ball bearings, and where threading the screw into the bore causes the screw to push downward on the ball bearings which causes the ball bearings to push on the positioning pin and extend it out of the body.

20 Claims, 2 Drawing Sheets

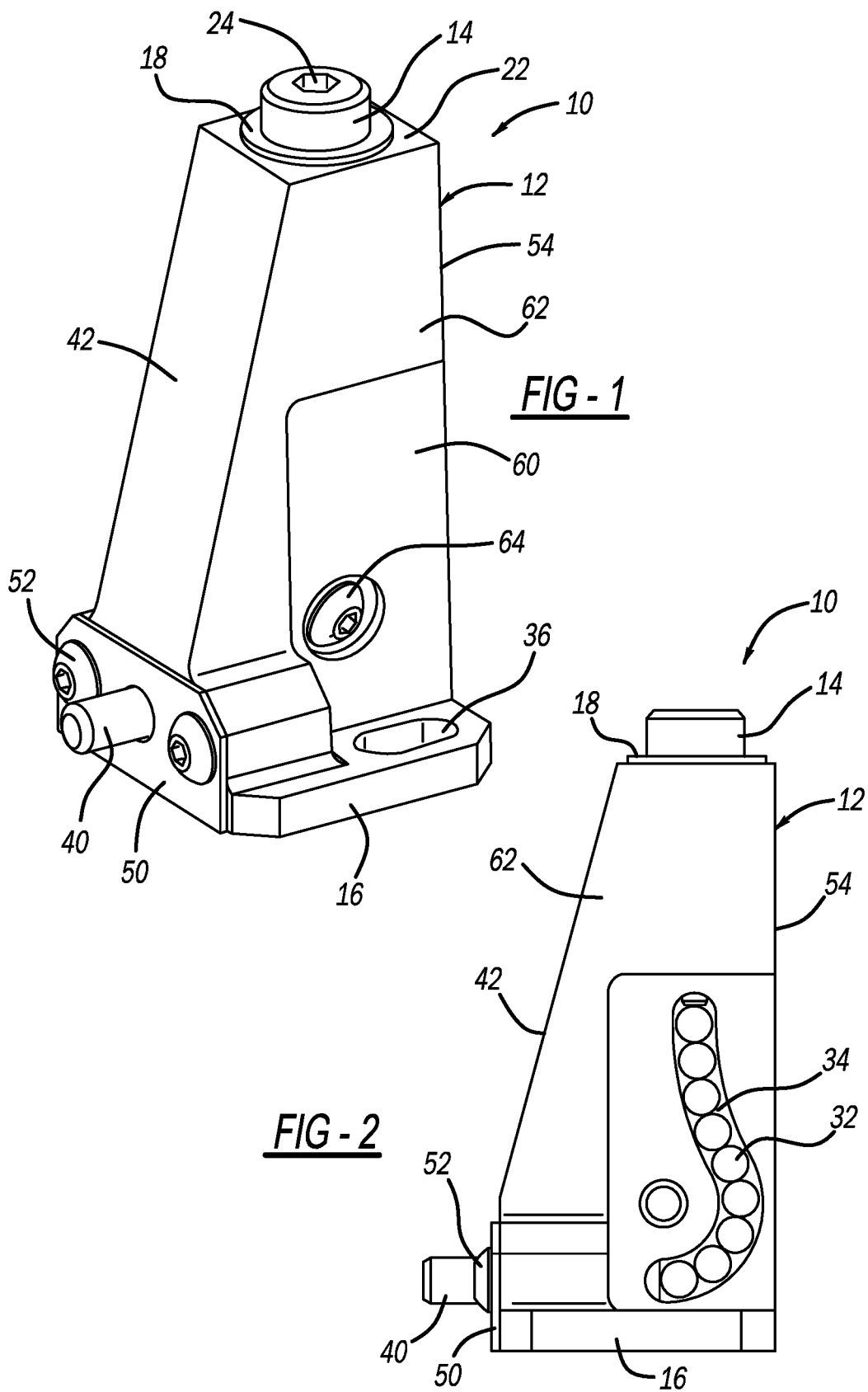

ANGULAR MOTION TRANSFER DRIVEN BY BALL BEARINGS

GOVERNMENT CONTRACT

This invention was made with Government support under contract HQ0727-17-F-1420 awarded by Defense Microelectronics Activity. The Government has certain rights in the invention.

BACKGROUND

Field

This invention relates generally to a positioning device for positioning an optical component and, more particularly, to a positioning device for positioning an optical component, where the positioning device employs ball bearings that allow a positioning pin to be moved by a screw from the top down.

Discussion

Various optical systems, such as laser systems, require a number of optical components, such as optical sources, lenses, reflectors, filters, refractors, etc., that are often secured to a common table, whether the optical system is being used in a laboratory environment or in an actual application. These optical components must be precisely aligned with each other so that optical beams propagate through the system in the desired manner. Therefore, high precision adjusters or nudgers are often secured to the table and positioned against a particular optical component, where the nudger includes a high thread count screw that pushes against the optical component to make precise positional adjustments to the component for accurate alignment. Different types of nudgers have different thread count screws and would be selected depending on the precision accuracy desired.

A typical nudger of the type referred to above requires the adjustment screw to be rotated by a suitable wrench from the same direction that the optical component is being moved. For example, if the optical component is being moved in an x-y direction, it is necessary to gain access to the head of the screw along that axis and opposite to the component. However, for certain optical systems, the various components may need to be positioned close together or close to the edge of the system, where space is often limited, which limits the ability to position the nudgers at the desired location. Therefore, there may be limits as to how small the system can be made, which may be undesirable for systems that need to be compact. What is needed is a top-down adjuster where the movement of an adjuster pin is performed by turning a screw configured perpendicular to the direction the component is actually being moved.

SUMMARY

This disclosure describes a positioning device for positioning an optical component from the top down. The device includes a body having a top surface, opposing side surfaces, a front surface and a rear surface. The body further includes a threaded bore extending into the body through the top surface, a pin chamber extending into the body through the front surface and a ball bearing channel formed in the body and being in communication with the threaded bore and the pin chamber. The device further includes a plurality of ball bearings positioned within the ball bearing channel, and a screw threaded into the threaded bore and being coupled to a top one of the ball bearings at a top end of the ball bearing channel. A positioning pin is positioned within the pin chamber and extends out of the pin chamber, where the positioning pin is coupled to a bottom one of the ball bearings at a bottom end of the ball bearing channel. Threading the screw into the bore causes the screw to push downward on the ball bearings, which causes the ball bearings to push on the positioning pin and extend it out of the body.

Additional features of the present invention will become apparent from the following description and appended claims, taken in conjunction with the accompanying drawings.

BRIEF DESCRIPTION OF THE DRAWINGS

FIG. 1 is an isometric view of a positioning device having a top-down adjustment;

FIG. 2 is a side view of the positioning device shown in FIG. 1; and

DETAILED DESCRIPTION OF THE EMBODIMENTS

Figure 3:
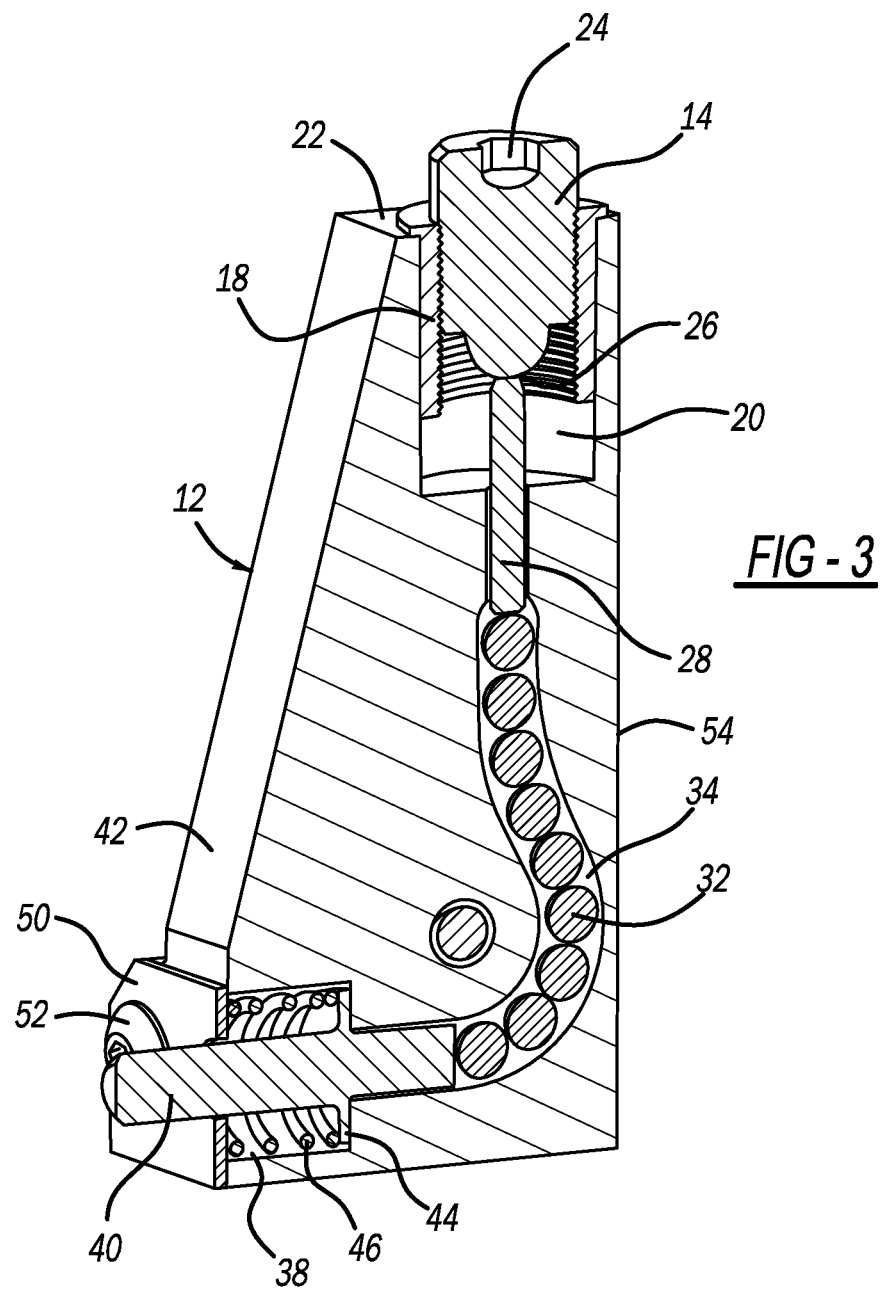
FIG. 3 is a cross-sectional isometric view of the positioning device shown in FIG. 1.

The following discussion of the embodiments of the disclosure directed to a top-down positioning device is merely exemplary in nature, and is in no way intended to limit the invention or its applications or uses. For example, the positioning device has particular application for positioning an optical component in an optical system. However, as will be appreciated by those skilled in the art, the positioning device will have other applications.

FIG. 1 is an isometric view, FIG. 2 is a side view and FIG. 3 is a cut-away isometric view of a high precision positioning device 10 including a body 12 having a certain shape for a particular application, where the body 12 is made of any suitable material, such as aluminum. The body 12 includes a mounting flange 16 having slots 36 that allow the device 10 to be mounted to a table (not shown). A fine pitch screw 14 is threaded into a threaded sleeve 18 secured within a bore 20 extending through a top surface 22 of the body 12. The screw 14 includes an opening 24 that accepts a suitable wrench (not shown) to rotate the screw 14 and thread it into and out of the body 12. A bottom end of the screw 14 includes a rounded nub 26 that is positioned against a top end of a downward extending pin 28. A bottom end of the pin 28 is positioned against a top ball bearing of a series of ball bearings 32 that are positioned within a curved ball bearing channel 34. A bottom ball bearing is positioned against a back end of an adjustment pin 40 that extends through a cylindrical chamber 38 and out of a front face 42 of the body 12, where the pin 40 includes an annular member 44. A spring cover plate 50 is bolted to the front face 42 to cover the chamber 38, where the pin 40 extends through the plate 50, as shown. A spring 46 is positioned within the chamber 38 and is in tension between the annular member 44 and the cover plate 50, where the pin 40 extends through the spring 46. A ball bearing cover plate 60 (not shown in FIG. 2) allows the channel 34 to be loaded with the ball bearings 32 and is bolted to a side face 62 of the body 12 by bolts 64.

When the screw 14 is threaded into the sleeve 18 the pin 28 pushes against the ball bearings 32, which push against the pin 40 and against the bias of the spring 46 to extend the pin 40 to adjust the position of an optical component (not shown). In this manner, the downward movement of the screw 14 is translated to a lateral movement of the pin 40 so that the optical component can be positioned from the top down. When the screw 14 is unthreaded from the sleeve 18 the bias of the spring 46 pushes against the annular member 44, which causes the pin 40 to retract into the body 12. The pin 40 is shown in its completely retracted position in FIGS. 1-3.

The channel 34 has a general J-shape to allow the screw 14 to be moved away from a back surface 54 of the body 12. In other words, the channel 34 curves towards the back surface 54 of the body 12 and then towards the front surface 42 so that the screw 14 can be moved more forward and the body 12 can be made more compact. It is noted that in this specific embodiment, the translation of the motion from the pin 28 to the pin 40 is 90°. However, this is application specific in that the angle relative to the pins 28 and 40 can be any desired angle, where the chamber 38 and the configuration of the ball bearing channel 34 would be appropriately configured for those angles.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A positioning device comprising:
    a body including a top surface, opposing side surfaces, a front surface, and a rear surface, said body further including a threaded bore extending into the body through the top surface, a pin chamber extending into the body through the front surface and a ball bearing channel formed in the body and being in communication with the threaded bore and the pin chamber, wherein the ball bearing channel has a general J-shape where the ball bearing channel extends downward from the screw, then towards the rear surface of the body, and then towards the front surface of the body;
    a plurality of ball bearings positioned within the ball bearing channel;
    a screw threaded into the threaded bore and being coupled to a top one of the ball bearings at a top end of the ball bearing channel; and
    a positioning pin positioned within the pin chamber and extending out of the pin chamber, said positioning pin being coupled to a bottom one of the ball bearings at a bottom end of the ball bearing channel, wherein threading the screw into the bore causes the screw to push downward on the ball bearings which causes the ball bearings to push on the positioning pin and extend it the positioning pin out of the body.

2. The positioning device according to claim 1 further comprising a downward pin positioned between a bottom end of the screw and the top ball bearing.

3. The positioning device according to claim 1 further comprising a side plate secured to one of the side surfaces and covering the ball bearing channel.

4. The positioning device according to claim 1 wherein the screw, the ball bearing channel, and the pin chamber are configured so that the direction of movement of the screw and the direction of movement of the positioning pin are substantially perpendicular to each other.

5. The positioning device according to claim 1 wherein the screw, the ball bearing channel and the pin chamber are configured so that the direction of movement of the screw and the direction of movement of the positioning pin are other than 90° relative to each other.

6. The positioning device according to claim 1 wherein the device is configured to position an optical element secured to a table.

7. The positioning device according to claim 1 wherein the body includes a mounting flange for mounting the device to a table.

8. The positioning device according to claim 1 further comprising a spring positioned within the pin chamber and causing the positioning pin to push upward on the ball bearings when the screw is threaded out of the body.

9. The positioning device according to claim 8 further comprising a cover plate secured to the front surface of the body and covering the pin chamber, said positioning pin extending through the cover plate.

10. The positioning device according to claim 9 wherein the positioning pin includes an annular portion, and wherein the spring is positioned between the annular portion and the cover plate under tension.

11. A positioning device for positioning a component, said positioning device comprising:
    a screw threaded into a top surface of a body;
    a plurality of ball bearings positioned within a curved channel in the body where a top one of the ball bearings is coupled to the screw, wherein the curved channel has a general J-shape where the curved channel extends downward from the screw, then towards a back surface of the body, and then towards a front surface of the body; and
    a pin positioned within and extending out of the front surface of the body, said pin being coupled to a bottom one of the ball bearings, wherein threading the screw into the body causes the screw to push downward on the ball bearings which causes the ball bearings to push on the pin and extend it the pin out of the body.

12. The positioning device according to claim 11 further comprising a spring positioned within the body and causing the pin to push upward on the ball bearings when the screw is threaded out of the body.

13. The positioning device according to claim 11 further comprising a side plate secured to a side surface of the body and covering the curved channel.

14. The positioning device according to claim 11 wherein the screw, the curved channel, and the pin are configured so that the direction of movement of the screw and the direction of movement of the pin are substantially perpendicular to each other.

15. The positioning device according to claim 11 wherein the screw, the curved channel, and the pin are configured so that the direction of movement of the screw and the direction of movement of the pin are other than 90° relative to each other.

16. The positioning device according to claim 11 wherein the device is configured to position an optical element secured to a table.

17. A positioning device for positioning an optical component secured to a table, said positioning device comprising:
    a body including a top surface, opposing side surfaces, a front surface, and a rear surface, said body further including a threaded bore extending into the body through the top surface, a pin chamber extending into the body through the front surface and a ball bearing channel formed in the body and being in communication with the threaded bore and the pin chamber, wherein the ball bearing channel has a general J-shape where the ball bearing channel extends downward from the threaded bore, then towards the rear surface of the body, and then towards the front surface of the body;

a plurality of ball bearings positioned within the ball bearing channel;

a screw threaded into the threaded bore and being coupled to a top one of the ball bearings at a top end of the ball bearing channel;

a positioning pin positioned within the pin chamber and extending out of the pin chamber, said positioning pin being coupled to a bottom one of the ball bearings at a bottom end of the ball bearing channel; and a spring positioned within the pin chamber, wherein threading the screw into the bore causes the screw to push downward on the ball bearings which causes the ball bearings to push on the positioning pin and extend it the positioning pin out of the body and unthreading the screw from the bore causes the spring to push the positioning pin upward on the ball bearings.

18. The positioning device according to claim 17 wherein the screw, the ball bearing channel, and the pin chamber are configured so that the direction of movement of the screw and the direction of movement of the positioning pin are substantially perpendicular to each other.

19. A positioning device for positioning a component, said positioning device comprising:

a screw threaded into a top surface of a body;

a plurality of ball bearings positioned within a curved channel in the body where a top one of the ball bearings is coupled to the screw;

a side plate secured to a side surface of the body and covering the curved channel; and a pin positioned within and extending out of a front surface of the body, said pin being coupled to a bottom one of the ball bearings, wherein threading the screw into the body causes the screw to push downward on the ball bearings which causes the ball bearings to push on the pin and extend the pin out of the body.

20. A positioning device for positioning a component, said positioning device comprising:

a screw threaded into a top surface of a body;

a plurality of ball bearings positioned within a curved channel in the body where a top one of the ball bearings is coupled to the screw;

a downward pin positioned between a bottom end of the screw and the top ball bearing; and a positioning pin positioned within and extending out of a front surface of the body, said positioning pin being coupled to a bottom one of the ball bearings, wherein threading the screw into the body causes the screw to push downward on the ball bearings which causes the ball bearings to push on the positioning pin and extend the positioning pin out of the body.

* * * * *